US009696407B1

(12) United States Patent
Greenleaf et al.

(10) Patent No.: US 9,696,407 B1
(45) Date of Patent: Jul. 4, 2017

(54) BACKUP NAVIGATION POSITION DETERMINATION USING SURVEILLANCE INFORMATION

(75) Inventors: William T. Greenleaf, Indialantic, FL (US); Andrew M. Vesel, Vincent, OH (US); Scott F. Bauler, Melbourne, FL (US); Steve J. Nieuwsma, Marion, IA (US); Richard S. Dove, Palm Bay, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1440 days.

(21) Appl. No.: 13/568,273

(22) Filed: Aug. 7, 2012

(51) Int. Cl.
*G01S 5/14* (2006.01)
(52) U.S. Cl.
CPC ...................................... *G01S 5/14* (2013.01)
(58) Field of Classification Search
CPC ..... G01S 5/02; G01S 5/08; G01S 5/10; G01S 5/12; G01S 5/14; G08G 5/045
See application file for complete search history.

(56) References Cited

U.S. PATENT DOCUMENTS

| | | | | |
|---|---|---|---|---|
| 2003/0001777 | A1* | 1/2003 | Johnson | G01S 5/12 342/387 |
| 2004/0203420 | A1* | 10/2004 | Rick | G01S 5/0009 455/67.11 |
| 2006/0217130 | A1* | 9/2006 | Rowitch | G01S 19/252 455/456.1 |
| 2007/0252760 | A1* | 11/2007 | Smith | G01S 5/0027 342/451 |
| 2009/0280828 | A1* | 11/2009 | Wang | H04W 64/003 455/456.1 |
| 2012/0262339 | A1* | 10/2012 | Garcia | G01S 5/10 342/387 |

(Continued)

FOREIGN PATENT DOCUMENTS

CN 101001458 A * 7/2007

OTHER PUBLICATIONS

F. Peide et al., New Approach for Swarming Aircraft Positioning via Network Information, Journal of Beijing University of Aeronautics and Astronautics, vol. 32(11), p. 1263-1267, Nov. 2006.*

(Continued)

*Primary Examiner* — Bernarr Gregory
*Assistant Examiner* — Fred H Mull
(74) *Attorney, Agent, or Firm* — Angel N. Gerdzhikov; Donna P. Suchy; Daniel M. Barbieri

(57) ABSTRACT

The present disclosure is directed to a system and method for determining an ownship position of an aircraft. The method includes the steps of receiving data from a plurality of proximate aircraft and examining the data. Next, the method involves selecting a plurality of reference aircraft from the plurality of proximate aircraft, and receiving data from each reference aircraft. The data received from the reference aircraft is then correlated to a common time in order to create a reference frame for calculating the position of the aircraft. The next step of the method is to calculate the ownship position of the aircraft based on the data received from the reference aircraft and the common time. The system includes a receiver, processor, display, and transmitter, which are used to determine the ownship position of an aircraft.

17 Claims, 5 Drawing Sheets

(56) References Cited

U.S. PATENT DOCUMENTS

2013/0002485 A1* 1/2013 Pratt .............. G01S 19/28
342/357.67

OTHER PUBLICATIONS

P. Xinxin, An Approach for Close-Form Solution of Multilateration Equations, Proceedings of the 8th World Congress on Intelligent Control and Automation, p. 5464-5468, Jul. 2010.*

Correlate. (2011). The American Heritage Dictionary of the English Language. Boston, MA: Houghton Mifflin. Retrieved from http://search.credoreference.com/content/entry/hmdictenglang/correlate/0.*

L. Juncheng, Swarming Aircraft Collaborative Localization Based on Mutual Rangings, Journal of Beijing University of Aeronautics and Astronautics, vol. 38(4), p. 541-545, Apr. 2012.*

Englilsh Translation of CN 101001458 A.*

* cited by examiner

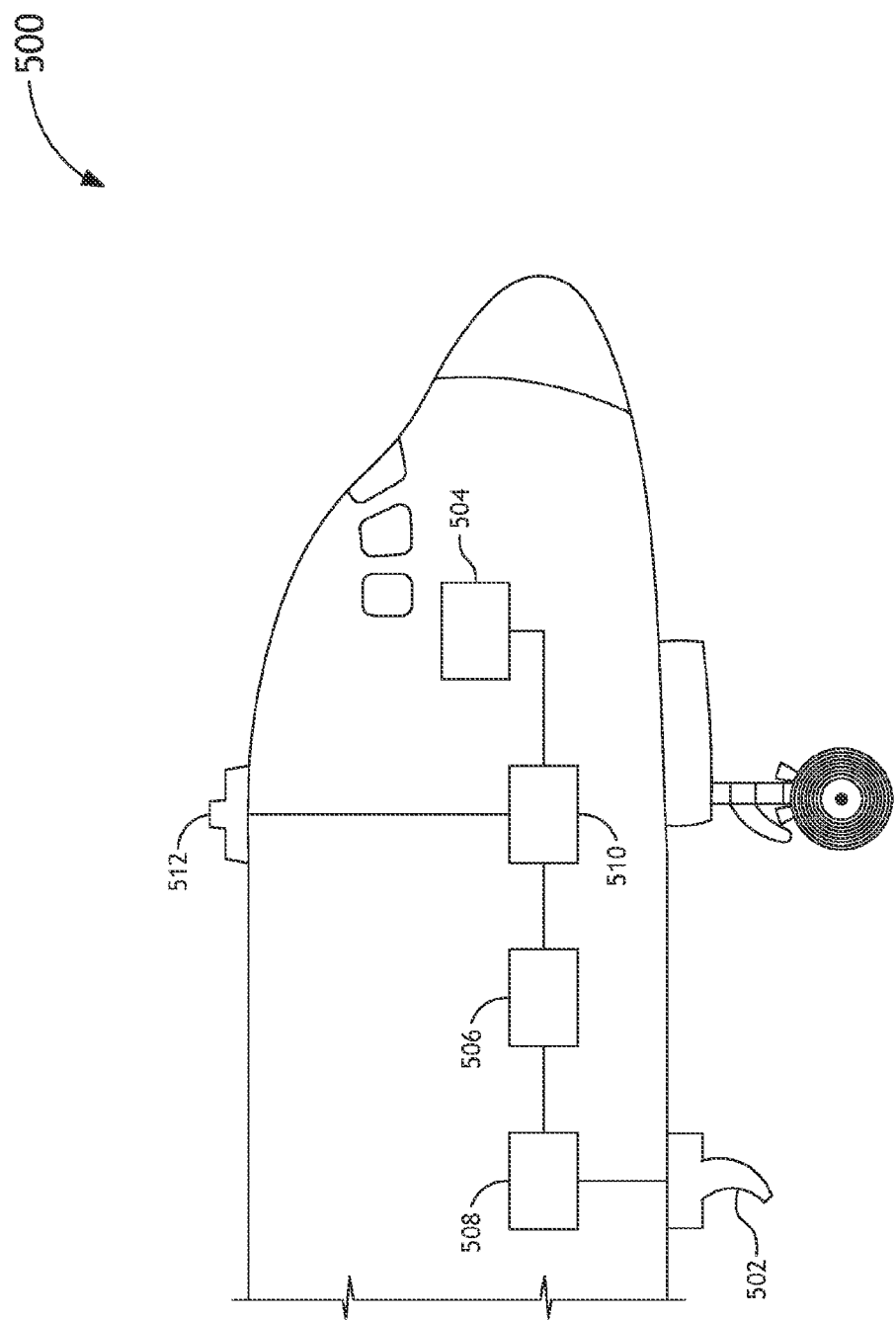

BACKUP NAVIGATION POSITION DETERMINATION USING SURVEILLANCE INFORMATION

CROSS-REFERENCE TO RELATED APPLICATIONS

The present application is related to issued U.S. Pat. No. 7,116,266 B1 filed on Jun. 16, 2004 and entitled "TRAFFIC ALERT AND COLLISION AVOIDANCE SYSTEM ENHANCED SURVEILLANCE SYSTEM AND METHOD," which is incorporated herein by reference.

TECHNICAL FIELD

The present disclosure generally relates to the field of aircraft position determination, and more particularly to a system and method for determining a backup navigation position of an aircraft using surveillance information.

BACKGROUND

Historically, if an aircraft suffers a total loss of navigation, the aircraft may have to rely upon a navigation solution which was computed on the ground and uploaded to the aircraft in order to determine its position. Similarly, a pilot may have to use pilotage techniques to manually calculate the position of the aircraft using on-board maps and visual sighting of landmarks on the ground. Other methods of position determination when there has been a total loss of navigation may include calculations relying upon a fixed coordinate frame of known distances between ground based objects (such as ground stations or air traffic control) to calculate the position of the aircraft, or other legacy methods of position determination and navigation.

In addition, when an aircraft suffers a total loss of navigation, the aircraft may be incapable of determining and reporting its ownship position. As a result, the aircraft position information may not be available to other aircraft or to air traffic control which is not equipped with or loses surveillance radar coverage. This may require air traffic controllers to rely on legacy methods for tracking the airplane. Air traffic control may also be required to re-route other aircraft in order to avoid traffic conflicts. In addition, without knowing its position, an aircraft is not allowed to participate in Automatic Dependent Surveillance Broadcast (ADS-B) applications.

Therefore, there exists a need for improved methods and systems for backup navigation position determination of an aircraft.

SUMMARY

The present disclosure is directed to a method for determining an ownship position of an aircraft. The method includes the steps of receiving data from a plurality of proximate aircraft and examining the data. Next, the method involves selecting a plurality of reference aircraft from the plurality of proximate aircraft, and receiving data from each reference aircraft. The data received from the reference aircraft is then correlated to a common time in order to create a reference frame for calculating the position of the aircraft. The next step of the method is to calculate the ownship position of the aircraft based on the data received from the reference aircraft and the common time.

The present disclosure is also directed to a method for determining the approximate ownship position of an aircraft. The method includes the steps of receiving data from a plurality of proximate aircraft and examining the data received. From this data, a plurality of reference aircraft are selected, and data is received from each reference aircraft. The data received from each reference aircraft must have a time stamp within a predetermined time window. This data is then used to calculate the approximate ownship position of the aircraft.

The present disclosure is also directed to a system for determining an ownship position of an aircraft. The system includes a receiver configured for receiving data from a plurality of proximate aircraft and a plurality of reference aircraft. The system also includes a display configured for displaying the data received from the plurality of proximate aircraft and the plurality of reference aircraft. The display is also configured for receiving inputs from an operator. The system further includes a processor configured for correlating the data received from the plurality of reference aircraft to a common time, and calculating the ownship position of the aircraft based on the data received from the plurality of reference aircraft and the common time. The system may also include a transmitter configured for communicating the ownship position of the aircraft.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which:

FIG. 5 depicts a system for determining the ownship position of an aircraft.

DETAILED DESCRIPTION

Reference will now be made in detail to the subject matter disclosed, which is illustrated in the accompanying drawings.

Figure 1:
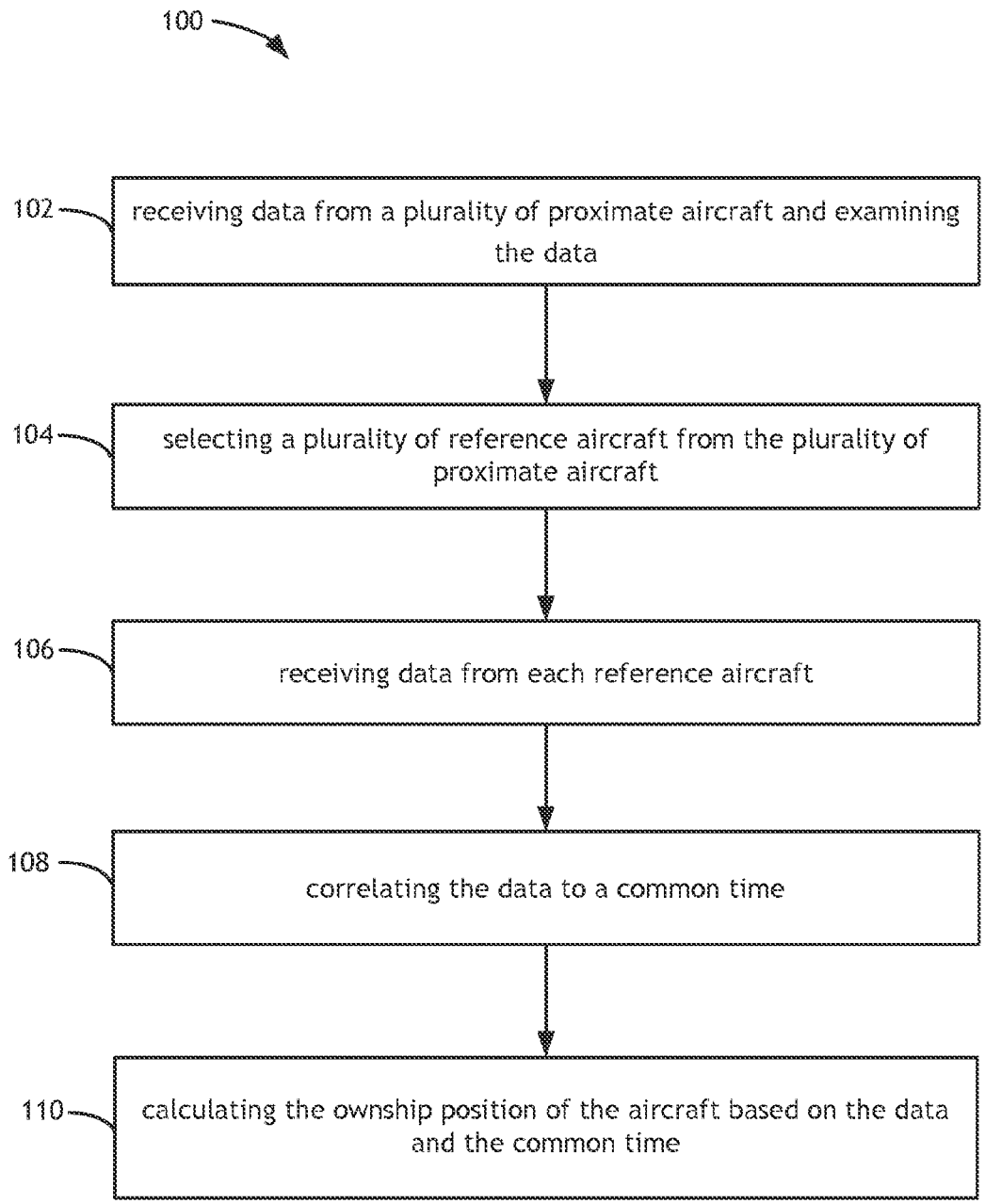
FIG. 1 depicts a method for determining the position of an aircraft.

Referring generally to FIG. 1, a method 100 for determining the ownship position of an aircraft is shown. The method 100 may include the step of receiving data from a plurality of proximate aircraft and examining the data 102 and selecting a plurality of reference aircraft from the plurality of proximate aircraft 104. The method 100 may also include receiving data from each reference aircraft 106 and correlating the data received to a common time 108. The final step of the method 100 includes calculating the ownship position of the aircraft based on the data and the common time 110.

The step of receiving data from a plurality of proximate aircraft and examining the data 102 of the method 100 may include receiving data from all of the aircraft in the general vicinity of the ownship aircraft. The data may be received continuously while the ownship aircraft is navigating, and only examined or used if necessary. Alternatively, the data may be received only if needed, for example, if there is a loss of primary navigation and the backup position of the ownship aircraft needs to be determined in accordance with the present method.

The step of receiving data from a plurality of proximate aircraft and examining the data 102 of the method 100 may include receiving data from a plurality of aircraft within a maximum distance of the last known position or estimated position of the aircraft. The data may be examined in list form, and the list may include the coordinates of the proximate aircraft. The list may also include information regarding the position, velocity, intent, nationality, aircraft type, bearing, altitude, or the like for the proximate aircraft. The data may further include information about the coordinate quality or merit quality of the proximate aircraft. The merit quality of the data for the proximate aircraft may include an assessment of the positional accuracy of the coordinate values for the proximate aircraft, as well as an indication of the source of the data. In one embodiment, the step of examining data from a plurality of proximate aircraft includes examining distance data from the Traffic Collision Avoidance System (TCAS), TCAS II, or Aircraft Collision Avoidance Systems for the proximate aircraft. The data may also be received using an Automatic Dependent Surveillance Broadcast (ADS-B) system, and may include ADS-B 1090 Extended Squitter data. The data may also be received using Universal Access Transceivers (UAT).

The next step of the method 100 involves selecting a plurality of reference aircraft from the plurality of proximate aircraft 104. The step of selecting a plurality of reference aircraft 104 may include selecting a plurality of reference aircraft each located within a certain distance from either the last known location of the aircraft or the approximate location of the aircraft at the time of selection. If the last known location of the aircraft is readily available and minimal time has elapsed between the timestamp of the last known location and the time at which the position of the aircraft is to be determined, the last known location of the aircraft may be used to select the reference aircraft.

The approximate location of the aircraft may also be used to select the reference aircraft. The approximate location of the aircraft may be determined using known methods and algorithms in the art for position determination based on the data received from the plurality of proximate aircraft. The calculation may be an overdeterminative solution, meaning there are more equations than unknowns, this usually allows the calculation to converge to a solution (in this case, the solution is the approximate position determination for the aircraft). In one example, the approximate position determination may be made based on Least Means Squared principles. The approximate position determination may also be made using a Weiner or Kalman filter algorithm, or other techniques.

The approximate position solution may also be used to calculate figures of merit for each of the plurality of the proximate aircraft. The figures of merit may be taken into account when selecting the plurality of reference aircraft. In one example of determining the approximate location of the aircraft, six proximate aircraft may be selected and used in the calculation, although it would be possible to use any number of proximate aircraft in the calculation.

Several factors may be taken into account when selecting a plurality of reference aircraft 104. The factors may include the proximity of the candidate reference aircraft to each other (the baseline) and relative to the last known position of the aircraft, or the approximate position of the aircraft. In one embodiment, each of the plurality of reference aircraft are located no more than a maximum distance from the last known position of the aircraft or the approximate position of the aircraft. The merit of the data for the candidate reference aircraft may also be a factor in the selection process. The figures of merit, as determined in calculating the approximate position of the aircraft, if available, may also be taken into account when selecting the plurality of reference aircraft. The selected reference aircraft should have good relative geometry, and should generally be dispersed.

The number of reference aircraft that may be required will vary depending on the position of the candidate reference aircraft relative to each other and relative to the last known position of the aircraft, or the approximate position of the aircraft.

After the step of selecting a plurality of reference aircraft 104, data must be received from each reference aircraft 106. The step of receiving data from each reference aircraft 106 may happen passively or automatically via existing systems on the aircraft. The step of receiving data from each reference aircraft 106 may occur through the same systems as receiving data from a plurality of proximate aircraft.

In an alternative embodiment, the step of receiving data from each reference aircraft 106 may occur as the result of an interrogation of the reference aircraft. For example, the ownship aircraft may interrogate one or more of the reference aircraft using the ownship aircraft's on board transponder (such as a Mode-S transponder or the like). The reference aircraft may respond to the interrogation request with its on-board transponder, and the response may include the data that was solicited in the interrogation request. The step of interrogating the reference aircraft and receiving data from the reference aircraft may use the methods described in related U.S. Pat. No. 7,116,266 B1, "Traffic Alert and Collision Avoidance System Enhanced Surveillance System and Method", which is hereby incorporated by reference.

The data received from each reference aircraft may be the same as the data received from the plurality of proximate aircraft, or may include additional or enhanced data. The data may be received using an Automatic Dependent Surveillance Broadcast (ADS-B) system, and may include ADS-B 1090 Extended Squitter data, data from Universal Access Transceivers, or uplinks from Traffic Information Service-Broadcast (TIS-B) systems. The data may also be received from an ACAS, TCAS or TCAS II system, or any other navigational system known in the art. The data received from each reference aircraft may include location, bearing, velocity, UTC timestamp, intent, aircraft type, Required Navigation Performance (RNP) compliance data, or any other data which may be useful for purposes of position determination or navigation. The data received from each reference aircraft may also include an indication of the source of the data. For example, the data may be sourced from a global positioning system (GPS), distance measuring equipment (DME), or the like.

After the step of receiving data from each reference aircraft 106, the data must be correlated to a common time 108. In one example, the data may be normalized to a common Coordinated Universal Time (UTC). The common timing basis may be used, along with the other data received from the reference aircraft, to create a reference frame to be used in calculating the position of the aircraft.

The next step includes calculating the ownship position of the aircraft based on the data and the common time 110. The calculation may rely on known computational algorithms for ground based position determination for an aircraft that has suffered a total loss of navigation. The known methods calculate the position of the aircraft using ground based references that are a known distance apart from each other to determine the position of the aircraft. The calculation of the present disclosure may be performed by substituting the data and common time of the reference aircraft selected in the previous step for the ground based references used in existing methods.

The calculation may employ a direct solution algorithm or an iterative solution. Using the iterative solution, the position of the aircraft is estimated, as well as an error residual for the position determination. The iteration is repeated until the error residual is below a predetermined requirement, or until a maximum number of iterations have been executed without converging on a solution.

The step of calculating the position of the aircraft based on the data and the common time 110 may be performed in a range that is sufficiently close to enable calculations within a tangential plane. For example, the calculations may be performed where the distances between the reference aircraft and the ownship aircraft are sufficiently close such that the tangential plane approximation lines up with the local tangential point of the ellipsoidal solution. This may facilitate a tangential plane approximation of the calculation, and reduces the complexity of the solution from spherical to planar geometry. However, if the calculation is performed within a tangential plane, it may be necessary to periodically compute the tangential plane based on the underlying reference ellipsoid for the calculation.

Alternatively, the step of calculating the position of the aircraft based on the data and the common time 110 may be performed in a range that requires the use of reference ellipsoids, such as World Geodetic System (WGS) 84, WGS 72, WGS 66, or North American Datum (NAD) 27.

The results of the position determination of the method 100 shown in FIG. 1 may be sufficiently accurate for navigating the aircraft. For example, if the onboard navigation systems fail and the aircraft is unable to determine its current position, the method 100 may be used to make that determination. The position of the aircraft as determined by the method may be communicated to an onboard navigation system for the aircraft. In addition, the position of the aircraft may be communicated to air traffic control, other aircraft, and the like.

An additional step of the method 100 shown in FIG. 1 may include performing a reasonableness check to determine the accuracy of the results of the position calculation performed according to the steps of the method 100. The reasonableness check includes calculating the distance between the ownship aircraft and at least one of the proximate aircraft, based on the calculated position of the ownship aircraft and positional data received from the proximate aircraft. Next, the ownship aircraft determines the distance between it and the proximate aircraft. In one embodiment, this determination is made by interrogating the proximate aircraft, thereby obtaining a measurement of the distance between them. The last step of the reasonableness check is to compare the calculated distance between the ownship aircraft and the proximate aircraft and the measured distance between the ownship aircraft and the proximate aircraft to obtain a validation of the accuracy of the position calculation determined by the method 100.

The reasonableness check may be completed by comparing the distances between the ownship aircraft and one other aircraft, or it may be determined by comparing the distances between the ownship aircraft and more than one additional aircraft. In selecting the comparison aircraft for the reasonableness check, the comparison aircraft should be one that was not selected to be a reference aircraft in determining the position of the ownship aircraft.

In addition, the results of the position determination of the method 100 shown in FIG. 1 may be sufficiently accurate for navigating the aircraft to a required performance standard. For example, the method 100 may be used to determine the ownship position of the aircraft to a degree that is sufficiently accurate to enable navigation to a Required Navigation Performance for an ocean crossing, for flight in RNP airspace, and for a specific RNP value for an approach. For example, the method 100 may be used to determine the ownship position of the aircraft to a degree that is sufficiently accurate to enable navigation to an RNP of 10 over oceanic airspace, an RNP of 0.3 for terminal space, or an RNP of 0.3 for an approach. In addition, the method 100 may be used to determine the ownship position of the aircraft to a degree that is sufficiently accurate to enable navigation to a Reduced Vertical Separation Minima of 1000 feet.

Figure 2:
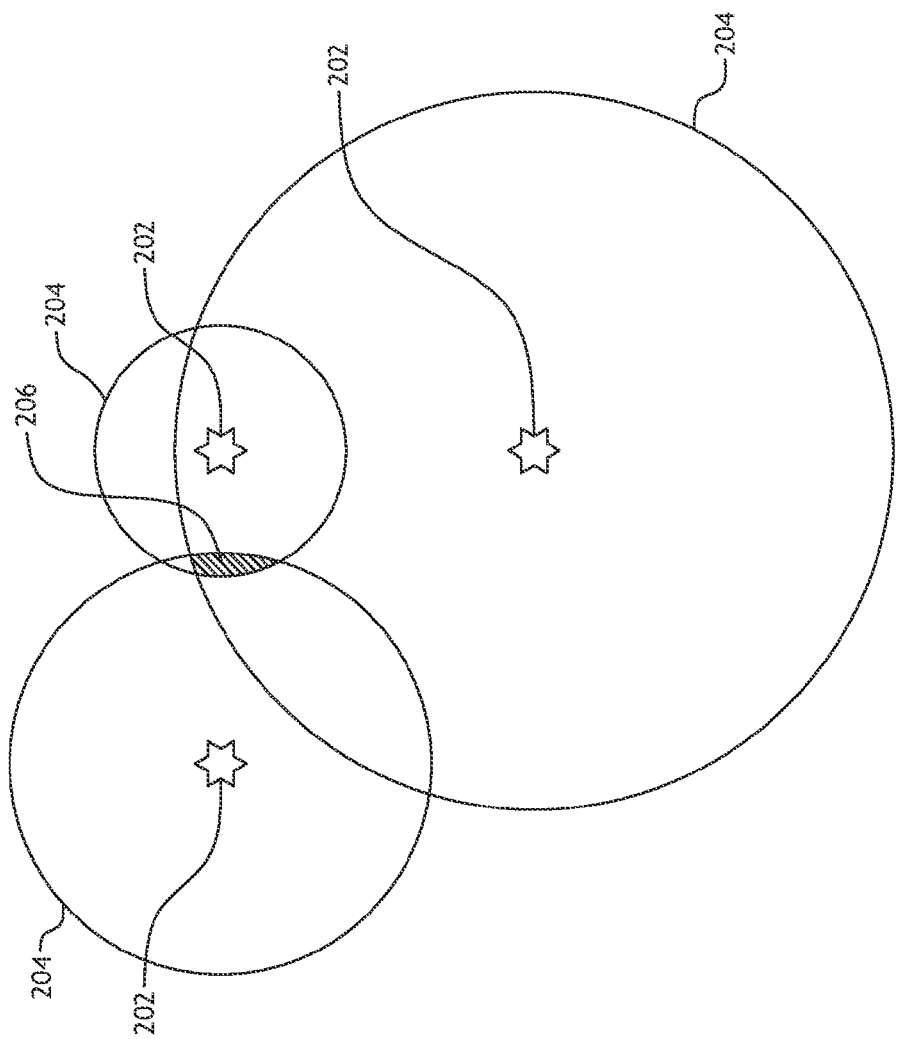
FIG. 2 depicts an example of the position determination of an aircraft in accordance with the methods of the present disclosure.

One example of the method for determining the position of an aircraft is shown in FIG. 2. In the example, the step of selecting a plurality of reference aircraft from the plurality of proximate aircraft of the method 100 may include selecting three reference aircraft 202 based on a last known actual location of the aircraft, or on a calculated approximate location of the aircraft. The reference aircraft may be located in a generally triangular configuration around the last known or approximate location of the aircraft. In the example, a circle of constant distance 204 is maintained around each of the reference aircraft 202, as measured by the Airborne Collision Avoidance System (ACAS) onboard each reference aircraft. The area 206 represents the calculated location of the aircraft according to the methods of the present invention.

Figure 3:
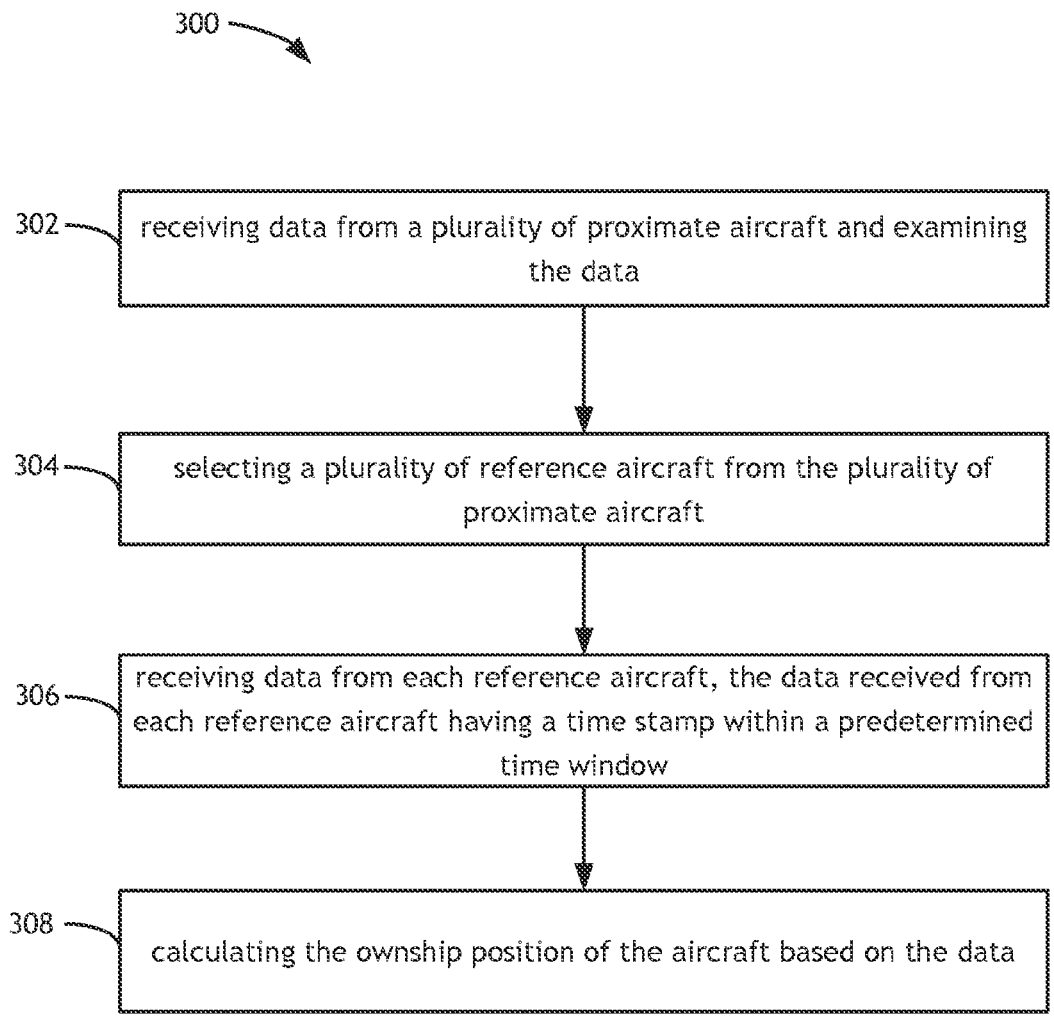
FIG. 3 depicts a method for determining the approximate position of an aircraft in accordance with the methods of the present disclosure.

A method 300 for determining the approximate position of an aircraft is shown in FIG. 3. The method 300 includes the step of receiving data from a plurality of proximate aircraft and examining the data 302, and selecting a plurality of reference aircraft from the plurality of proximate aircraft 304. Next, the data is received from each reference aircraft, the data received from each reference aircraft having a time stamp within a predetermined time window 306. The method also includes calculating the position of the aircraft based on the data 308. This method can result in an approximate position determination within a known accuracy range, provided that the timestamp for the data received from each of the reference aircraft falls within a predetermined window. For example, using the method, if the reference aircraft are traveling at approximately 600 knots, the time stamp for the data received for each reference aircraft must be within one second of each other in order to achieve a 1 nautical mile area range position determination for the ownship aircraft. The length of the predetermined window of time will vary depending on the speed of the reference aircraft, and the level of precision required in the approximate position determination.

Figure 4:
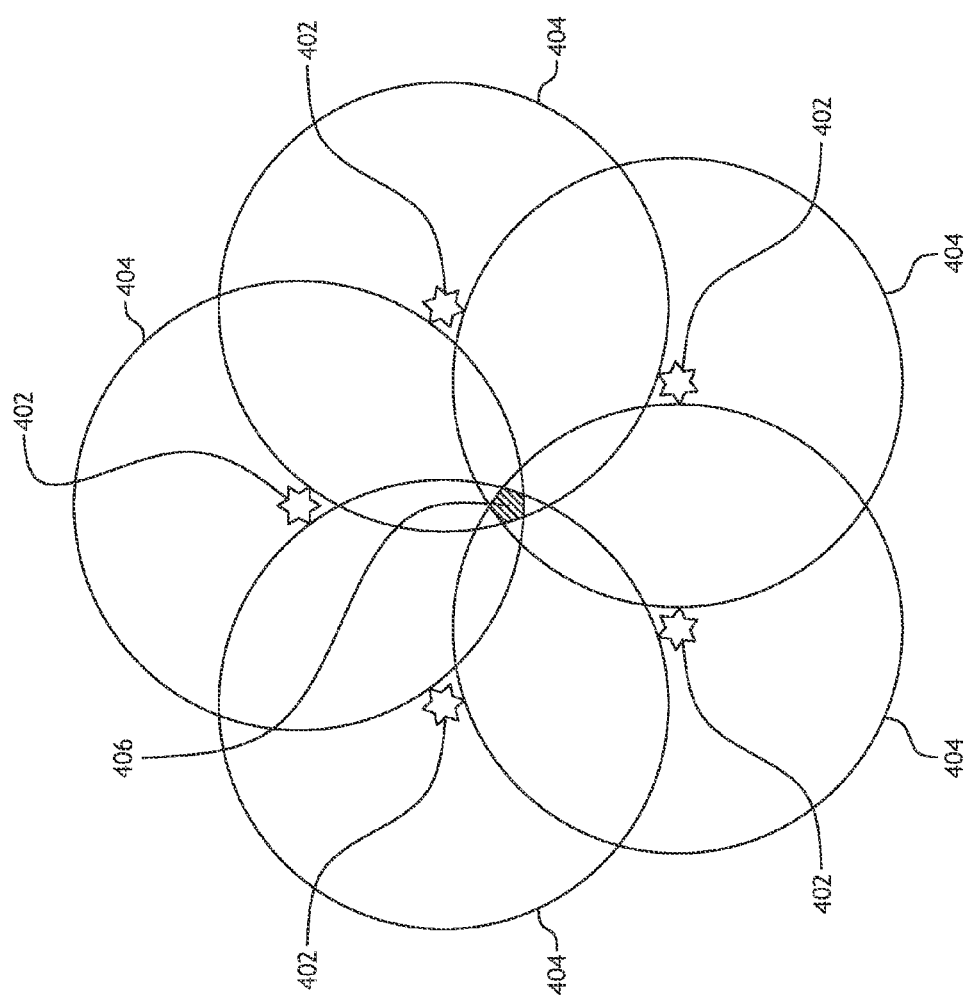
FIG. 4 depicts an example of the approximate position determination of an aircraft in accordance with the methods of the present disclosure.

An additional example of the method for determining the position of an aircraft is shown in FIG. 4. In the example, the step of selecting a plurality of reference aircraft may include selecting five reference aircraft 402 based on the approximate location of the aircraft. The reference aircraft 402 may be located in a generally circular configuration around the approximate location of the aircraft. In the example, a circle of constant distance 404 is maintained around each of the reference aircraft 402, as measured by the Airborne Collision Avoidance System (ACAS) on board each reference aircraft. The area 406 represents the calculated location of the ownship aircraft, based on either a direct determination solution or an iterative solution, in accordance with the present disclosure.

The present disclosure is also directed to a system 500 for determining the position of an aircraft. The system 500 includes an antenna 502 configured for receiving data from a plurality of reference aircraft and proximate aircraft. The system 500 also includes a display 504 configured for displaying the data received from the plurality of reference aircraft to an operator. The display 504 may also be configured for receiving inputs from an operator. The system 500 also includes a processor 506 configured for correlating the data received from the plurality of reference aircraft to a common time. The processor 506 may be further configured for calculating the position of the aircraft based on the data received from the plurality of reference aircraft and the common time. The system 500 may also include a receiver/transmitter 508 configured for communicating the position of the aircraft. The receiver/transmitter 508 may be a combined receiver and transmitter or they may be separate elements. Similarly, the antenna 502 may be separate or may be combined with the receiver/transmitter 508. The system 500 may be used for backup position determination of the aircraft if other navigation systems have failed. The system 500 may also be used to provide navigation information to on board or off board navigation systems in order to facilitate navigation of the plane to the original destination or an alternate destination when there has been a total loss of navigation.

The system 500 may optionally include a navigation processor 510, configured for processing navigational information received from a GPS 512, inertial navigation system, distance measuring equipment system, or a dead reckoning system.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method for determining an ownship position of an aircraft in response to the aircraft suffering a loss of primary navigation, comprising the steps of:

receiving, by at least one receiver of the aircraft, data from a plurality of proximate aircraft;

in response to the aircraft suffering the loss of primary navigation, examining, by at least one processor of the aircraft, the data from the plurality of the proximate aircraft, each of the plurality of proximate aircraft being a candidate to be selected as a reference aircraft;

upon examining the data from the plurality of the proximate aircraft, selecting, by the at least one processor of the aircraft, at least three reference aircraft from the plurality of proximate aircraft based at least on a distance between each of the plurality of proximate aircraft to a last known position of the aircraft;

receiving, by the at least one receiver of the aircraft, data associated with a particular reference aircraft of the at least three reference aircraft from each of the at least three reference aircraft;

correlating, by the at least one processor of the aircraft, the data from the at least three aircraft to a common time;

calculating, by the at least one processor of the aircraft, the ownship position of the aircraft based on the data received from the at least three reference aircraft and the common time, wherein the calculated ownship position is an approximate location of the aircraft;

performing, by the at least one processor of the aircraft, a reasonableness check of the calculated ownship position of the aircraft to validate an accuracy of the calculated ownship position by comparing a calculated distance between the aircraft and at least one comparison aircraft, wherein the at least one comparison aircraft is different from the at least three reference aircraft;

communicating, by an antenna of the aircraft, the calculated ownship position to an off board system off of the aircraft;

communicating, by the at least one processor of the aircraft, the calculated ownship position to an onboard system of the aircraft; and displaying, by a display, the calculated ownship position to an operator to facilitate navigating the aircraft during the loss of primary navigation.

2. The method of claim 1, wherein the data associated with the particular reference aircraft includes at least one of: 1090 Extended Squitter data, Air Collision Avoidance System data, or Universal Access Transmitter data.

3. The method of claim 1, wherein the data associated with the particular reference aircraft includes location, aircraft type, velocity, Coordinated Universal Time (UTC) timestamp, and intent data.

4. The method of claim 1, wherein calculating, by the at least one processor of the aircraft, the ownship position of the aircraft based on the data received from the at least three reference aircraft and the common time includes calculating, by the at least one processor of the aircraft, the ownship position of the aircraft based on the data received from the at least three reference aircraft and the common time by using at least one of: a direct solution algorithm or an iterative solution.

5. The method of claim 1, wherein calculating, by the at least one processor of the aircraft, the ownship position of the aircraft based on the data received from the at least three reference aircraft and the common time results in an ownship position determination that is sufficiently accurate to comply with a Required Navigation Performance.

6. The method of claim 1, wherein calculating, by the at least one processor of the aircraft, the ownship position of the aircraft based on the data received from the at least three reference aircraft and the common time results in an ownship position determination that is sufficiently accurate for navigating the aircraft.

7. The method of claim 1, further comprising the step of: interrogating, by a transponder, each of the at least three reference aircraft.

8. The method of claim 1, further comprising the step of: determining an accuracy of the calculated ownship position of the aircraft by comparing a calculated distance between the aircraft and a proximate aircraft of the plurality of proximate aircraft to a measured distance between the aircraft and the proximate aircraft of the plurality of proximate aircraft.

9. A method for determining an approximate ownship position of an aircraft in response to the aircraft suffering a loss of primary navigation, comprising the steps of:
receiving, by at least one receiver of the aircraft, data from a plurality of proximate aircraft;
in response to the aircraft suffering the loss of primary navigation, examining, by at least one processor of the aircraft, the data from the plurality of the proximate aircraft, each of the plurality of proximate aircraft being a candidate to be selected as a reference aircraft;
upon examining the data from the plurality of the proximate aircraft, selecting, by the at least one processor of the aircraft, at least three reference aircraft from the plurality of proximate aircraft based at least on a distance between each of the plurality of proximate aircraft to a last known position of the aircraft;
receiving, by at least one receiver of the aircraft and from each of the at least three reference aircraft, data associated with a particular reference aircraft of the at least three reference aircraft and having a time stamp within a predetermined time window;
calculating, by the at least one processor of the aircraft, the approximate ownship position of the aircraft based on the data received from the at least three reference aircraft;
performing, by the at least one processor of the aircraft, a reasonableness check of the calculated approximate ownship position of the aircraft to validate an accuracy of the calculated approximate ownship position by comparing a calculated distance between the aircraft and at least one comparison aircraft, wherein the at least one comparison aircraft is different from the at least three reference aircraft;
communicating, by an antenna of the aircraft, the calculated approximate ownship position to an off board system off of the aircraft;
communicating, by the at least one processor of the aircraft, the calculated approximate ownship position to an onboard system of the aircraft; and
displaying, by a display, the calculated approximate ownship position to an operator to facilitate navigating the aircraft during the loss of primary navigation.

10. The method of claim 9, wherein the data associated with the particular reference aircraft includes at least one of: 1090 Extended Squitter data, Air Collision Avoidance System data, or Universal Access Transmitter data from each reference aircraft.

11. The method of claim 9, wherein the data associated with the particular reference aircraft includes at least one of location, aircraft type, velocity, Coordinated Universal Time (UTC) timestamp, and intent data.

12. The method of claim 9, wherein calculating, by the at least one processor of the aircraft, the approximate ownship position of the aircraft based on the data received from the at least three reference aircraft includes calculating, by the at least one processor of the aircraft, the approximate ownship position of the aircraft based on the data received from the at least three reference aircraft by using at least one of: a direct solution algorithm or an iterative solution.

13. The method of claim 9, further comprising the step of: interrogating, by a transponder, each of the at least three reference aircraft.

14. A system for determining an ownship position of an aircraft in response to the aircraft suffering a loss of primary navigation, comprising:
a receiver, the receiver configured to receive for receiving data from a plurality of proximate aircraft and to receive, from each of at least three reference aircraft of the plurality of proximate aircraft, data associated with a particular reference aircraft of the at least three reference aircraft;
a processor communicatively coupled to the receiver, the processor programmed to:
in response to the aircraft suffering the loss of primary navigation, examine the data from the plurality of the proximate aircraft, each of the plurality of proximate aircraft being a candidate to be selected as a reference aircraft based at least on a distance between each of the plurality of proximate aircraft to a last known position of the aircraft;
upon examining the data from the plurality of the proximate aircraft, select the at least three reference aircraft from the plurality of proximate aircraft;
correlate the data from the at least three aircraft to a common time;
calculate the ownship position of the aircraft based at least on the data received from the at least three reference aircraft and the common time, wherein the calculated ownship position is an approximate location of the aircraft; and
perform a reasonableness check of the calculated ownship position of the aircraft to validate an accuracy of the calculated ownship position by comparing a calculated distance between the aircraft and at least one comparison aircraft, wherein the at least one comparison aircraft is different from the at least three reference aircraft;
a display communicatively coupled to the processor, the display configured to display the calculated ownship position to facilitate navigating the aircraft during the loss of primary navigation and to display the data received from the plurality of proximate aircraft including the at least three reference aircraft, the display further configured to receive inputs from an operator; and
a transmitter communicatively coupled to the processor, the transmitter configured to communicate the calculated ownship position of the aircraft to an off board system off of the aircraft.

15. The system of claim 14, wherein the data associated with a particular reference aircraft includes at least one of: location data, velocity data, Coordinated Universal Time (UTC) timestamp data, intent data, 1090 Extended Squitter data, or Universal Access Transceiver data.

16. The system of claim 14, wherein the processor is further configured for calculating the ownship position of the aircraft by using at least one of: a direct solution algorithm or an iterative solution.

17. The system of claim 14, wherein the processor is configured for calculating the ownship position of the aircraft to a degree sufficiently accurate to comply with a Required Navigation Performance standard.

\* \* \* \* \*